United States Patent [19]

Hönl

[11] Patent Number: 4,553,716
[45] Date of Patent: Nov. 19, 1985

[54] MECHANISM IN ROLL-UP DEVICE FOR SAFETY BELTS IN MOTOR VEHICLES

[75] Inventor: Wolf-Dieter Hönl, Böbingen, Fed. Rep. of Germany

[73] Assignee: REPA Feinstanzwerk GmbH, Aldorf, Fed. Rep. of Germany

[21] Appl. No.: 659,028

[22] Filed: Oct. 9, 1984

Related U.S. Application Data

[63] Continuation of Ser. No. 468,979, Feb. 23, 1983, abandoned.

[30] Foreign Application Priority Data

Feb. 24, 1982 [DE] Fed. Rep. of Germany ....... 3206627

[51] Int. Cl.$^4$ .................. A62B 35/00; B65H 75/48
[52] U.S. Cl. .................................. 242/107.7
[58] Field of Search ............ 242/107.7, 107.6, 107.12, 242/107.4 R–107.4E; 280/806–808; 297/475–478

[56] References Cited

U.S. PATENT DOCUMENTS

| | | | |
|---|---|---|---|
| Re. 29,095 | 1/1977 | Heath | 242/107.7 |
| 3,873,041 | 3/1975 | Rumpf et al. | 242/107.4 D |
| 4,053,116 | 10/1977 | Takada | 242/107.7 |
| 4,059,242 | 11/1977 | Tanaka | 242/107.4 A |
| 4,108,395 | 8/1978 | Heath | 242/107.7 |
| 4,124,175 | 11/1978 | Cislak | 242/107.7 |
| 4,258,887 | 3/1981 | Fohl et al. | 242/107.4 B X |
| 4,386,745 | 6/1983 | Patel et al. | 242/107.6 |

Primary Examiner—John M. Jillions
Attorney, Agent, or Firm—Yount & Tarolli

[57] ABSTRACT

Mechanism in roll-up devices for safety belts in motor vehicles, where the safety belt which, addressed by one or more danger sensors, can be blocked via a belt shaft, is stressed in tension by a spring force in the winding-up direction of the belt shaft, and where, within a short range of rotation of the belt shaft in the pull direction of the safety belt, a locking device for the belt shaft, acting against the elastic winding-up spring force, is made effective by control gates of plate cams. The locking wheel of the locking device, connected to the belt shaft secured against rotation is arranged within a first ring-shaped plate cam which can be swung freely between two stops within a recess and is equipped with a control recess within a control gate. The first plate cam is in frictional contact via a friction element with a second plate cam which is arranged axially next to the first plate cam and the locking wheel. The second plate cam can be swund freely between stops of the first plate can and is equipped with a control recess within a control gate. A fixed counter-supported locking pawl is guided with elastic contact at the circular control gates of the two plate cams, out of engagement with the locking wheel. The locking pawl engages and blocks the locking wheel if the control recesses are simultaneously opposite each other.

6 Claims, 3 Drawing Figures

MECHANISM IN ROLL-UP DEVICE FOR SAFETY BELTS IN MOTOR VEHICLES

This is a continuation co-pending application of Ser. No. 468,979 filed on Feb. 23, 1983, now abandoned.

BACKGROUND OF THE INVENTION

1. Field of the Invention

The present invention relates to a mechanism in roll-up devices for safety belts in motor vehicles, where the safety belt which, addressed by one or more danger sensors, can be blocked via a belt shaft, is stressed in tension by a spring force in the winding-up direction of the belt shaft, and where, within a short range or rotation of the belt shaft in the pull direction of the safety belt, a locking device for the belt shaft, acting against the elastic winding-up spring force, is made effective by control gates of plate cams.

2. Description of the Prior Art

Safety belts which have an end held by a mechanism for rolling-up and holding the safety belt taut, are used for protecting passenger against injuries. Into this mechanism is built a device which is capable of blocking this mechanism and thereby, also the safety belt, in the event that an extreme acceleration or braking force, which normally occurs in accidents, acts through a built-in danger sensor on the motor vehicle or the motor vehicle passenger.

Safety belts applied as close to the body as possible lead to increased safety against accident injuries. For this reason, safety belt arrangements are equipped with a mechanism which pulls the safety belt against the body. This mechanism serves at the same time for rolling-up the safety belt as far as possible if the safety belt is taken off. As a result a loosely hanging safety belt which impedes persons entering or leaving the vehicle and leads to accidents is avoided.

To accomplish the rolling-up function for the safety belt in a satsifactory manner, an appropriate pulling force must be exerted on the safety belt. This is normally effected by a spring element arranged in the rolling-up mechanism. The force action exerted by the spring element propagates via the safety belt and affects the persons protected by the safety belt according to regulations in a disagreeable manner. A reduction of the pulling force by the roll-up mechanism would clearly have a more favorable effect on the person to be protected. Reducing the restoring forces for the safety belt by a corresponding amount, however, would also affect the pulling-back function adversely, usually to an excessive degree.

For this reason, it has become known (U.S. Pat. No. 3,834,646) to make available a sufficiently large pulling-back force for the safety belt as well as to take care that this pulling-back force is made ineffective at times. This is accomplished, for instance, via plate cams which act on a locking device. This locking device is capable of blocking the belt shaft at least against the rolling-up force if corresponding control criteria are fed-in via the plate cams. As a control criterion it is evaluated on what distance the safety belt has traveled from its last-occupied rest position by pulling it out against the restoring force. As a further criterion it is evaluated whether, for instance, the car door is open. The position of the door can be signaled to the control device of the locking mechanism via a flexible cable. An open door is evaluated to cause the locking device to be put out of action in any case, so that the safety belt is rolled up.

SUMMARY OF THE INVENTION

The mechanism according to the invention is based on this state of the art. An object of the present invention is to provide a mechanism for roll-up devices of safety belts in motor vehicles, the design of which is particularly simple and cost-saving and which operates reliably and with little maintenance. In particular, the mechanism according to the invention requires little space and provides favorable conditions for transmitting the control forces.

With the foregoing and other objects in view, there is provided in accordance with the invention a mechanism in roll-up devices for safety belts for persons in motor vehicles comprising a housing, a belt shaft rotatably supported in the housing, a safety belt wound around the belt shaft, a winding-up spring connected to the belt shaft with sufficient force to wind up the belt when loose and hold it taut against a person wearing the safety belt, a locking device having a locking wheel connected to the belt shaft and a locking pawl to engage and block the locking wheel, said locking wheel arranged within a first ring-shaped plate cam freely rotatable around the belt shaft between two stops, said first plate cam having a control gate and a control recess within the control gate, a second plate cam in frictional contact via a friction element, said second plate cam arranged axially next to the first plate cam and the locking wheel and can rotate freely between stops of the first plate cam, said second plate cam having a control recess within the control gate, said locking pawl in contact with the circular control gates of the two plate cams which maintain it out of engagement with the locking wheel except when the belt is pulled out a short distance from the rest position against the force of the winding up spring within a small range of rotation of the belt shaft in the unwinding direction of the belt shaft to cause the control recesses of the two plate cams to come opposite each other permitting the locking pawl to engage and block the wheel to relieve the person from the pulling force of the winding-up spring.

Other features which are considered as characteristic for the invention are set forth in the appended claims.

Although the invention is illustrated and described herein as embodied in a mechanism in a roll-up device for safety belts in motor vehicles, it is nevertheless not intended to be limited to the details shown since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
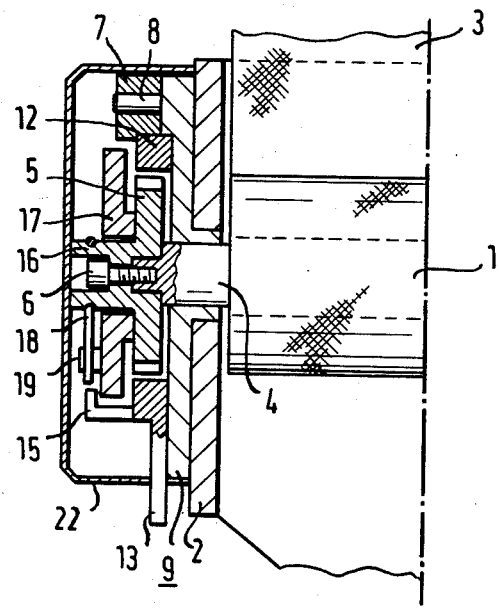
FIG. 1 is a side view showing a cross section of the mechanim in accordance with the invention.

According to the invention, a mechanism which is suitable for temporarily relieving the belt of the pulling force of the rewinding spring by blocking the belt shaft, is characterized by the feature that the locking wheel of the locking device, which is connected to the belt shaft secured against rotation, is arranged within a ring-shaped first plate cam which can be swung freely between stops and is equipped with a control recess within a control gate. The first plate cam is in frictional contact via a friction element with a second plate cam which is arranged next to the first plate cam and the locking wheel. The second plate cam can be swung freely between stops of the first plate cam and is provided with a control recess within the control gate. A locking pawl which is fixed and counter-supported, is guided out of engagement with the locking wheel, in elastic contact with the circular control gates of the two plate cams. The locking pawl seizes and blocks the locking wheel if the control recesses of the plate cams reach a position directly opposite each other.

A mechanism designed according to these features of the invention has the special advantage that relatively little space is required for its construction, i.e., the mechanism is very flat. For this reason, components of control and locking forces scarcely occur in the axial direction.

The mechanism according to the invention is used such that locking of the belt shaft is normally put out of action, that is prevented, by the gates of the plate cam. The safety belt can, therefore, be pulled off the roll-up mechanism against the force of the winding-up-spring and rewound on the belt shaft by the roll-up spring. If, however, only a predetermined small shift is executed in the pulling-off direction, i.e. unwinding of the belt from the last-occupied rest position of the safety belt, then the plate cams influence the locking device such that the belt shaft and, thereby, the safety belt are blocked at least against the pulling direction of the winding-up spring. The latter is thereby prevented from exerting a force on the safety belt and thus the person wearing the safety belt is relieved of discomfort in this respect.

The utilization of the mechanism has the advantage that the pull-back spring can be made strong enough to place the safety belt tightly about the person to be protected, and to wind it on the belt shaft if not in use. Nevertheless, the person to be protected can free himself or herself of the contact pressure of the safety belt. This can be accomplished by setting the locking device for the belt shaft in operation by a brief and slight loosening of the safety belt. Larger loosening excursions at the safety belt, however, release the locking of the belt shaft.

According to one preferred embodiment, the mechanism is characterized by the feature that the friction element between the belt shaft and the second plate cam is formed by a spring element which resiliently surrounds a shaft extension of the locking wheel with sliding friction and is connected with at least one part to the second plate cam. Preferably, the mechanism according to the invention is characterized by the feature that the spring element is arranged in a slot on the shaft extension of the locking wheel, and that the second plate cam is rotatably supported on the shaft extension of the locking wheel between the latter and the spring element.

These measures reduce the amount of technical means for fulfilling the desired operating cycles to a very low level. Nevertheless, high operating reliability is achieved.

According to another preferred embodiment, the mechanism according to the invention is characterized by the feature that a ratchet wheel and a ratchet pawl are arranged as a locking device. These detent elements ensure a reliable, specific locking effect for the belt shaft against the force of the pullback spring for the belt shaft.

An embodiment example equipped according to the features of the invention will be described in greater detail in the following with reference to the drawings. The actual safety belt roll-up mechanism is shown only incompletely in the drawings. As is conventional, the roll-up mechanism has a belt shaft 1 which is rotatably supported in a housing 2. The belt shaft 1 carries, rolled-up, a safety belt 3. Not shown is a winding-up spring which attempts to roll-up the safety belt 3 on the belt shaft 1, as well as a blocking mechanism which locks the safety belt 3 via the belt shaft in the event of danger. As intended, the winding-up spring for the safety belt must be designed so that it is capable of either keeping the safety belt 3 taut on the person to be protected or, of rolling the belt up on the belt shaft 1 when the belt is taken off. The force of the winding-up spring, which acts via the safety belt 3, is often annoying to the person wearing the safety belt 3. The mechanisms shown in the drawings provide suitable measures by which it is possible to make this pulling-back force of the winding-up spring become inactive for the person to be protected. This is accomplished subsequent to putting the safety belt on by, in a first operation, withdrawing the belt, i.e. pulling it off the belt shaft 1 and then partially pulling it back, permitting the belt to retract in a second operation to make the belt taut against the body of the person, and third, by lifting this safety belt briefly, that is withdrawing a very short length of belt from the roll-up device, whereby a locking device acts on the belt shaft 1 and thereby intercepts the pulling-back force of the winding-up spring and makes it ineffective for the person to be protected. It must be ensured that the safety belt sets the locking device in operation only within a small excursion, so that the safety belt 3 around the person to be protected is not too loose when the belt shaft 1 is locked.

Figure 2:
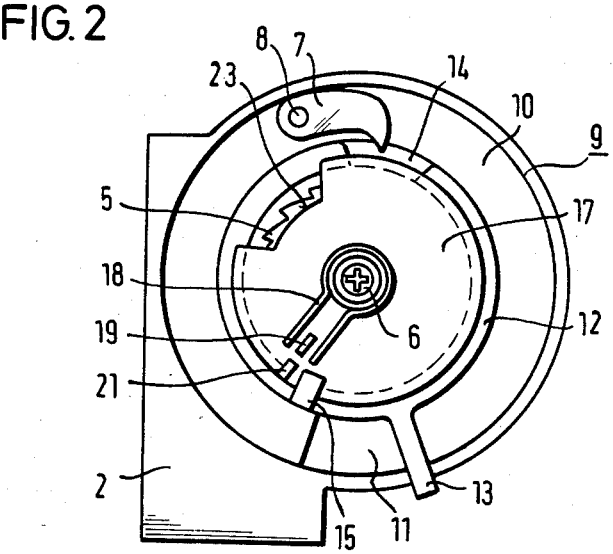
FIG. 2 is a view of the mechanism with the cap removed of FIG. 1 in the axial direction.
Figure 3:
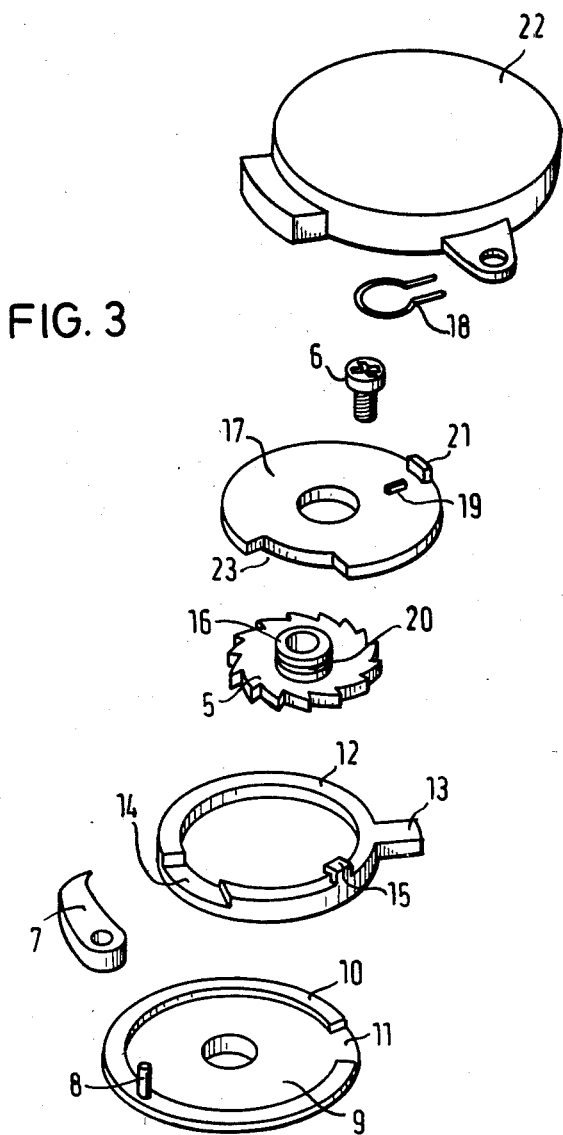
FIG. 3 is a perspective exploded view of the mechanism of FIG. 1.

FIGS. 1–3 show in different presentations such a locking mechanism. A ratchet wheel 5 is firmly connected on an extension 4 of the belt shaft 1 by means of a screw 6. The corresponding ratchet pawl 7 is supported on a pin 8 which is part of a base plate 9 fastened to the housing 2. This base plate 9 has in the region of its circumference a ring-shaped rim 10 which is interrupted by a recess 11. A ring-shaped plate cam 12 which carries a driver lever 13 is disposed within this rim 10 on the base plate 9. The driver lever 13 protrudes through the recess of the base plate 9. Thereby, this plate cam can be actuated from the outside, for instance via a flexible cable, which can be the means to signal whether the car door is open.

The plate cam 12 designed as a control gate for the pawl 7 is shaped in part as a control recess 14 for the ratchet pawl 7. In addition, the plate cam 12 carries a driver extension 15. The ratchet wheel 5 which is flanged to the belt shaft is disposed within the plate cam 12.

Another plate cam 17 is rotatably supported on a shaft extension 16 of this ratchet wheel 5. It is held in the axial direction by a friction spring 18 and is taken along via a boss 19 in a force-coupled manner because of the friction of the ring spring 18 in the slot 20 of the shaft extension 16. The stop 21 of the plate cam 17 cooperates with the driver extension 15 of the plate cam 12. A cap 22 shields the mechanism from the outside.

In the base position, with the safety belt 3 wound up, the driver lever 13 of the plate cam 12 rests in the recess 11 of the base plate 9. The stop 21 of the plate cam 17 is to the left of the driver extension 15 of the plate cam 12. Thereby, the pawl 7 rests on the plate cam 17.

If the safety belt is pulled out, the belt shaft 1 and with it the ratchet wheel 5 rotate clockwise. The plate cam 17 corotates via the friction spring 18 which engages the extension 19. After barely one revolution, the stop 21 comes to rest at the right against the driver extension 15 of the plate cam 12. The latter corotates until the driver lever 13 comes to a stop at the left in the recess 11. If the belt shaft 1 continues to be rotated, the friction spring 18 slips through on the shaft extension 16 of the ratchet wheel 5 and the plate cams 12 and 17 remain in their last-occupied position.

If the safety belt 3 executes greater backward travel in the winding-up direction, the plate cam 17 is turned back via the ratchet wheel 5, the friction spring 18 and the extension 19. The plate cam 17 takes along the plate cam 12 via the stop 21 and the driver extension 15 until the driver lever 13 comes to a stop at the right in the recess 11 of the base plate 9. Then, the control recess 14 of the plate cam 12 lies under the pawl 7.

If now the belt is pulled out slightly against the pulling-back force of the winding-up mechanism, not shown, then the plate cam 17 is turned clockwise by a small amount. Then, a recess 23 likewise comes to lie under the pawl 7. Then, the pawl can engage the ratchet wheel 5 and thereby block the belt shaft 1 against the pulling back force of the winding-up mechanism.

Pulling the safety belt 3 out further releases this blockage again. Thus, further withdrawal of the safety belt 3 rotates the cam plate 17 with the ratchet wheel 5. This causes the trailing edge of the recess 23 to cam the pawl 7 radially outwardly of the ratchet wheel 5.

I claim:

1. A safety belt retractor assembly having a belt reel which is rotated to retract the safety belt, said retractor assembly comprising a ratchet wheel connected with the belt reel and having a circular array of teeth, a control pawl having an end portion movable into engagement with the circular array of teeth on the ratchet wheel to prevent retraction of the safety belt, and control means for blocking engagement of said control pawl with said ratchet teeth during retraction of a substantial length of the safety belt and for enabling said control pawl to engage said ratchet teeth upon withdrawal of a short length of the safety belt from the reel, said control means including a first control member having a circular blocking surface means for engaging said end portion of said pawl to block engagement of said pawl with said circular array of teeth on said ratchet wheel during retraction of a substantial length of the safety belt, said blocking surface means at least partially circumscribing said ratchet wheel and being disposed radially outwardly of and in axial alignment with said circular array of ratchet teeth, said first control member having a circular inner side surface which at least partially circumscribes said ratchet wheel and is disposed radially outwardly of and in axial alignment with said circular array of ratchet teeth, said first control member having an opening extending between said blocking surface means and said inner side surface, said opening being disposed radially outwardly of and in axial alignment with said circular array of ratchet teeth, said end portion of said pawl being movable through said opening to engage said ratchet teeth upon withdrawal of a short length of the safety belt.

2. A safety belt retractor assembly as set forth in claim 1 wherein said circular inner side surface of said first control member at least partially defines a circular central opening, said ratchet wheel being disposed in said circular central opening.

3. A safety belt retractor assembly as set forth in claim 2 wherein said retractor assembly further includes base means for engaging the circular blocking surface means to support said first control member for rotation about an axis which is coincident with the central axis of said ratchet wheel.

4. A safety belt retractor assembly having a belt reel mounted on a frame for rotation in a first direction to extend a safety belt and in a second direction to retract the safety belt, said retractor assembly comprising a base member fixedly connected with the frame, said base member having an inner side surface which defines a portion of a circle, a first rotatable control member having a circular outer side surface disposed in sliding engagement with the circular inner side surface of said base member to rotatably support said first control member, said first control member having an inner side surface which defines a portion of a circle, said first control member being rotatable relative to said base member between a blocking position and nonblocking position, said first control member including surface means for defining an opening extending between the inner and outer side surfaces of said first control member, a ratchet wheel having a circular array of teeth which is at least partially in radial and axial alignment with the inner side surface of said first control member and which is at least partially circumscribed by the inner side surface of said first control member, said ratchet wheel and first control member being rotatable about the central axis of the reel, a second control member mounted in a coaxial relationship with said ratchet wheel and first control member and having an outer side surface which at least partially defines a circle, said second control member being disposed adjacent to one axial side of said ratchet wheel, said second control member including surface means for defining a recess extending inwardly from the outer side surface of said second control member, and a control pawl connected with and pivotal relative to the frame, said control pawl having surface means for engaging teeth on said ratchet wheel to prevent retraction of the safety belt, said pawl being pivotal to an engaged position in which said pawl extends through the opening in said first control member and into the recess in said second control member to engage the array of teeth on said ratchet wheel to block rotation of the reel in a direction to retract the safety belt when the opening in said first control member and the recess in said second control member are in aligned positions, said pawl surface means being engageable with the outer side surface of said first control member to hold said pawl out of engagement with said ratchet wheel when said first control member is offset from its aligned position and said second control member is in its aligned position, said pawl surface means being engageable with the outer side surface of said second control member to hold said pawl out of engagement with said ratchet wheel when said second control member is offset to one side of its aligned position and said first control member is in its aligned position.

5. A safety belt retractor as set forth in claim 4 wherein said base member includes surface means for at least partially defining a recess which extends radially outwardly from said inner side surface of said base member, said first control member including a projection which extends radially outwardly from said outer side surface of said first control member, said projection having an arcuate extent which is less than the arcuate extent of the recess in said base member, said surface means defining said recess in said base member including first and second stop surfaces which are spaced apart by an arcuate distance which is greater than the arcuate extent of said projection, said projection being disposed in abutting engagement with said first stop surface when said first control member is in its aligned position, said projection being disposed in abutting engagement with said second stop surface when said first control member is offset to one side of its aligned position.

6. A safety belt retractor assembly having a belt reel which is rotated to retract the safety belt, said retractor assembly comprising a ratchet wheel connected with the belt reel and having a circular array of teeth, a control pawl having an end portion movable into engagement with the circular array of teeth on the ratchet wheel to prevent retraction of the safety belt, and control means for blocking engagement of said control pawl with said ratchet teeth during retraction of a first length of the safety belt and for enabling said control pawl to engage said ratchet teeth upon withdrawal of a second length of the safety belt from the reel, said second length of safety belt being shorter than said first length of safety belt, said control means including a first control member and a second control member, said first control member having a circular blocking surface which at least partially circumscribes said ratchet wheel and is disposed radially outwardly of and in axial alignment with said circular array of ratchet teeth, said first control member having a circular inner side surface which at least partially circumscribes said ratchet wheel and is disposed radially outwardly of and in axial alignment with said circular array of ratchet teeth, said first control member having an opening extending between said blocking and inner side surfaces, said first control member being movable between a nonaligned condition in which said blocking surface is disposed between said end portion of said pawl and said circular array of ratchet teeth and an aligned condition in which said opening is aligned with said end portion of said pawl, said second control member having a circular blocking surface and a recess which extends inwardly from said blocking surface on said second control member, said second control member being movable between a nonaligned condition in which said blocking surface on said second control member is disposed between said end porion of said pawl and said circular array of ratchet teeth and an aligned condition in which said recess is aligned with said end portion of said pawl, said end portion of said pawl being engageable with the blocking surface on said first control member to hold said pawl out of engagement with said ratchet wheel when said first control member is in its nonaligned condition and said second control member is in its aligned condition, said end portion of said pawl being engageable with the blocking surface on said second control member to hold said pawl out of engagement with said ratchet wheel when said second control member is in its nonaligned condition and said first control member is in its aligned condition, and drive means for moving said second control member while said first control member is stationary and for moving said first and second control members together, said drive means being operable to move said first control member from its nonaligned condition to its aligned condition during retraction of the first lengh of the safety belt and to move said second control member from its nonaligned condition to its aligned condition while said first control member remains stationary during subsequent withdrawal of the second length of safety belt.

* * * * *